(12) United States Patent
Lee et al.

(10) Patent No.: US 9,790,841 B2
(45) Date of Patent: Oct. 17, 2017

(54) VEHICLE EXHAUST HEAT RECOVERY SYSTEM AND METHOD

(71) Applicant: Hyundai Motor Company, Seoul (KR)

(72) Inventors: Joon-Hee Lee, Incheon (KR); Jun-Yong Lee, Seongnam-si (KR); Myung-Jun Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 14/806,285

(22) Filed: Jul. 22, 2015

(65) Prior Publication Data

US 2016/0169080 A1 Jun. 16, 2016

(30) Foreign Application Priority Data

Dec. 15, 2014 (KR) .......................... 10-2014-0180630

(51) Int. Cl.
*F01P 7/14* (2006.01)
*F01P 7/16* (2006.01)

(52) U.S. Cl.
CPC .............. *F01P 7/16* (2013.01); *Y02T 10/146* (2013.01); *Y02T 10/16* (2013.01)

(58) Field of Classification Search
CPC .. F01P 2060/02; F01P 3/20; F01P 7/16; F01P 2003/027; F01P 2007/146; F01P 5/10; F01P 1/06; F01P 2003/028; F01P 7/14; F01P 2003/182; F01P 7/026; Y02T 10/26
USPC ............ 123/41.1, 41.05, 41.2, 41.08, 41.21, 123/41.42, 41.44, 41.72
See application file for complete search history.

(56) References Cited

U.S. PATENT DOCUMENTS

| | | | |
|---|---|---|---|
| 2005/0000473 A1* | 1/2005 | Ap .......................... | F01P 7/165 123/41.1 |
| 2009/0078220 A1* | 3/2009 | Meyer ..................... | F01P 7/165 123/41.31 |
| 2015/0114339 A1* | 4/2015 | Sellnau ................... | F02N 19/04 123/294 |
| 2015/0217622 A1* | 8/2015 | Enomoto ............ | B60H 1/00878 165/42 |
| 2016/0003127 A1* | 1/2016 | Sakagawa ................ | F01P 3/12 123/41.1 |

FOREIGN PATENT DOCUMENTS

| JP | 10-318055 A | 12/1998 |
|---|---|---|
| JP | 2004-270487 A | 9/2004 |
| JP | 2006-83784 A | 3/2006 |
| JP | 2012-180786 A | 9/2012 |
| JP | 2013-24110 A | 2/2013 |
| JP | 2013-148244 A | 8/2013 |

(Continued)

*Primary Examiner* — Marguerite McMahon
*Assistant Examiner* — Tea Holbrook
(74) *Attorney, Agent, or Firm* — Morgan, Lewis & Bockius LLP

(57) ABSTRACT

An exhaust heat recovery system may include a coolant circulation circuit arranged to connect an engine, an exhaust heat exchanger, a radiator, a water-cooled intercooler, and a sub-radiator, and controls each valve arranged on a passage which connects the engine, the exhaust heat exchanger, the radiator, the water-cooled intercooler, and the sub-radiator to the coolant circulation circuit according to the coolant temperature so as to control temperatures of coolant and intake air, thereby enabling the engine to be rapidly warmed up.

16 Claims, 9 Drawing Sheets

(56) References Cited

FOREIGN PATENT DOCUMENTS

| KR | 10-2011-0062138 A | 6/2011 |
| KR | 10-2013-0012998 A | 2/2013 |
| KR | 10-2013-0049999 A | 5/2013 |

\* cited by examiner

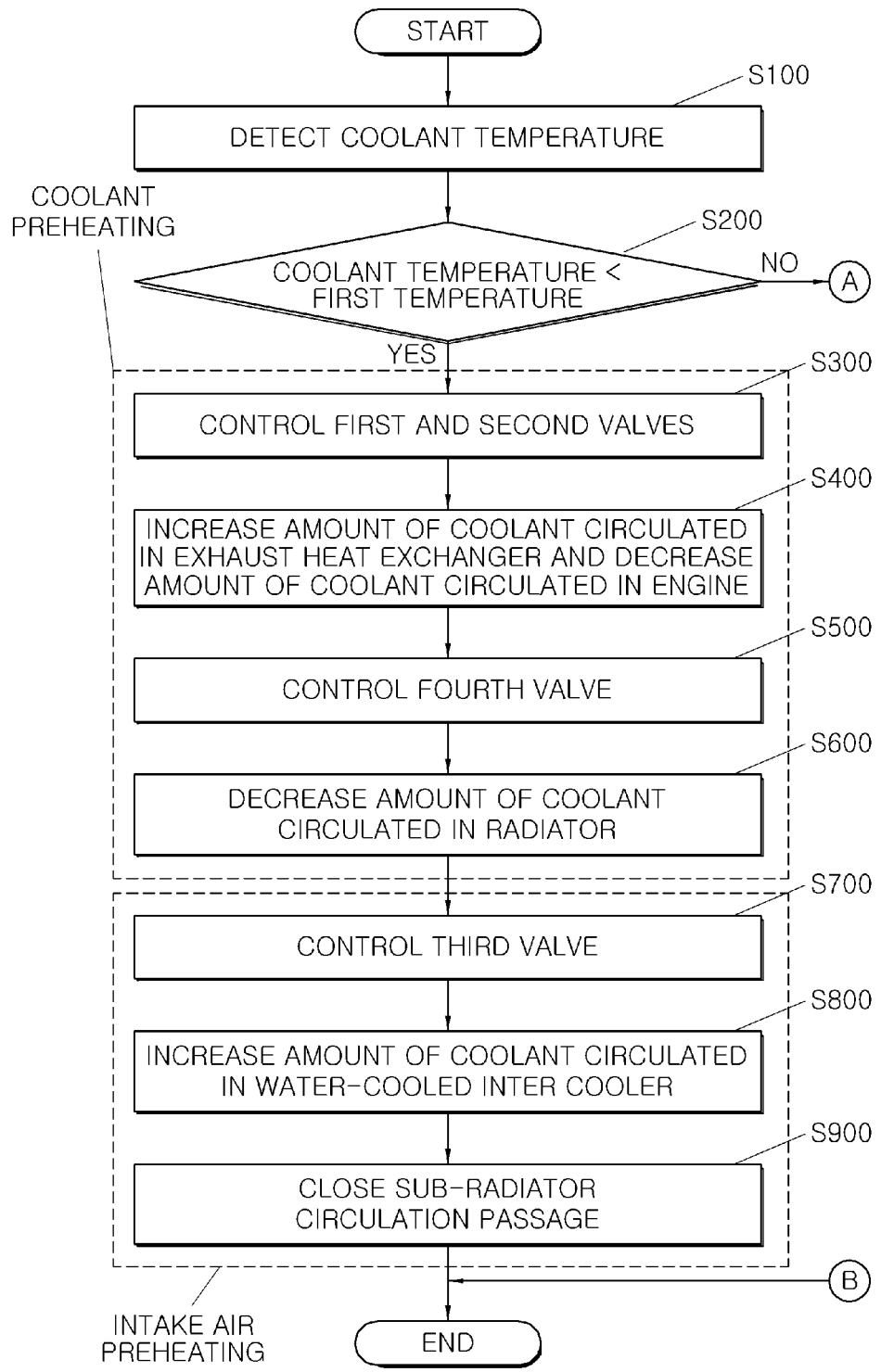

VEHICLE EXHAUST HEAT RECOVERY SYSTEM AND METHOD

CROSS-REFERENCE(S) TO RELATED APPLICATIONS

The present application claims priority to Korean Patent Application No. 10-2014-0180630, filed on Dec. 15, 2014 which is incorporated herein by reference in its entirety.

BACKGROUND OF THE INVENTION

Field of the Invention

Exemplary embodiments of the present invention relate to a vehicle exhaust heat recovery system; and, particularly, to a vehicle exhaust heat recovery system and method, capable of actively controlling an amount of coolant circulated through an exhaust heat exchanger, an engine, a radiator, and a water-cooled intercooler according to a temperature condition of the coolant, so as to improve fuel efficiency in a cold state.

Description of Related Art

Regulations of CO2 emission and fuel efficiency are increasingly reinforced by global warming all over the world. Fuel efficiency of a vehicle has been improved by improving combustion and power transfer processes until now. However, a study on improvement of fuel efficiency using heat lost by exhaust gas is actively ongoing in recent years.

An internal combustion engine of a vehicle uses thermal efficiency less than 40% from among 100% of heat energy of fuel used in the vehicle, and 30% of the heat energy is discharged as exhaust gas to the atmosphere and is discarded.

An exhaust heat recovery system is a system capable of shortening a preheating time of an engine to achieve improvement of fuel efficiency and reduction of exhaust gas, by heating coolant during initial starting of a vehicle using high-temperature exhaust heat discarded as described above.

However, the conventional exhaust heat recovery system requires complicated bypass devices, for example, so as to control a supply amount of exhaust gas flowing to the exhaust heat recovery system by installing a variable valve or the like at an end of an exhaust pipe and bypassing the exhaust gas according to opening and closing of the variable valve in order to control a degree of recovery of exhaust heat, as in Patent Document 1. For this reason, there is a problem in that the system has an increased capacity and mounting thereof is deteriorated.

BRIEF SUMMARY

Various aspects of the present invention are directed to providing a vehicle exhaust heat recovery system and method, capable of improving fuel efficiency by rapidly preheating an engine through a simple structure and control method even though a complicated device for bypassing exhaust gas or coolant is not used in order to control a degree of recovery of exhaust heat.

The present invention adjusts a flow rate of coolant and a temperature of intake air by controlling a passage of coolant circulated through an exhaust heat exchanger, an engine, a water-cooled intercooler, a radiator and a sub radiator without using a method of bypassing exhaust gas or coolant.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a vehicle exhaust heat recovery system includes an exhaust heat exchanger transferring heat energy of exhaust gas discharged from an engine to coolant so as to increases a temperature of the coolant, a radiator radiating heat of the coolant heated through heat exchange with the engine, a water-cooled intercooler cooling intake air using the coolant, a sub-radiator radiating heat of the coolant heated through the water-cooled intercooler, a coolant circulation circuit arranged to connect the engine, the exhaust heat exchanger, the radiator, the water-cooled intercooler, and the sub-radiator, a water pump allowing the coolant to be circulated along the coolant circulation circuit through the engine, the exhaust heat exchanger, the radiator, the water-cooled intercooler, and the sub-radiator, a first valve for opening and closing connection between the exhaust heat exchanger and the coolant circulation circuit, a second valve for opening and closing connection between the engine and the coolant circulation circuit, a third valve mounted on a distribution line for distributing the coolant supplied along the coolant circulation circuit to the water-cooled water pump and the sub-radiator, a fourth valve for opening and closing connection between the radiator and the coolant circulation circuit, a temperature sensor for measuring the temperature of the coolant circulated along the coolant circulation circuit, and a control unit adjusting opening degrees of the first to fourth valves according to the coolant temperature measured by the temperature sensor.

The engine may have a passage communicating between a cylinder head and a cylinder block such that the coolant flows in the passage, and the second valve may include a cylinder head-side valve for blocking circulation of the coolant from the cylinder head of the engine to the coolant circulation circuit, and a cylinder block-side valve for blocking circulation of the coolant from the cylinder block of the engine to the coolant circulation circuit.

The water pump may be mounted to the cylinder head of the engine so as to be driven by receiving rotational force through a drive belt from a cam shaft or a crank shaft.

The control unit may preheat the coolant and the intake air when the coolant temperature detected by the temperature sensor is less than a first temperature, preheat the coolant and cools the intake air when the coolant temperature detected by the temperature sensor is equal to or greater than the first temperature and is less than a second temperature, cool the coolant and the intake air when the coolant temperature detected by the temperature sensor is equal to or greater than the second temperature and is less than a third temperature, and cool the engine when the coolant temperature detected by the temperature sensor is equal to or greater than the third temperature, by adjusting the opening degrees of the first to fourth valves.

When the coolant temperature detected by the temperature sensor is less than the first temperature, the control unit may open the first valve to open a coolant passage of the exhaust heat exchanger, open the cylinder head-side valve and closes the cylinder block-side valve of the second valve so as to decrease a flow rate of the coolant passing through the engine by opening of only a cylinder head-side coolant passage of the engine, control the third valve to open a passage of the coolant flowing to the water-cooled intercooler while closing a passage of the coolant flowing to the sub-radiator, and close the fourth valves to close a passage of the coolant flowing to the radiator.

When the coolant temperature detected by the temperature sensor is equal to or greater than the first temperature and is less than the second temperature, the control unit may open the first valve to open a coolant passage of the exhaust heat exchanger, open the cylinder head-side valve and the cylinder block-side valve so as to open both of a cylinder head-side coolant passage and a cylinder block-side coolant passage of the engine, control the third valve to close a passage of the coolant flowing to the water-cooled intercooler while opening a passage of the coolant flowing to the sub-radiator, and close the fourth valves to close a passage of the coolant flowing to the radiator.

When the coolant temperature detected by the temperature sensor is equal to or greater than the second temperature and is less than the third temperature, the control unit may close the first valve to close a coolant passage of the exhaust heat exchanger, open the cylinder head-side valve and the cylinder block-side valve so as to open both of a cylinder head-side coolant passage and a cylinder block-side coolant passage of the engine, control the third valve to close a passage of the coolant flowing to the water-cooled intercooler while opening a passage of the coolant flowing to the sub-radiator, and close the fourth valves to close a passage of the coolant flowing to the radiator.

When the coolant temperature detected by the temperature sensor is equal to or greater than the third temperature, the control unit may close the first valve to close a coolant passage of the exhaust heat exchanger, open the cylinder head-side valve and the cylinder block-side valve so as to open both of a cylinder head-side coolant passage and a cylinder block-side coolant passage of the engine, control the third valve to close a passage of the coolant flowing to the water-cooled intercooler while opening a passage of the coolant flowing to the sub-radiator, and open the fourth valves to open a passage of the coolant flowing to the radiator.

In accordance with another embodiment of the present invention, a vehicle exhaust heat recovery method using a vehicle exhaust heat recovery system having a circulation circuit of coolant circulated along an engine, an exhaust heat exchanger, a radiator, a water-cooled intercooler, and a sub-radiator for cooling the water-cooled intercooler, includes detecting a temperature of the coolant, preheating coolant and intake air by controlling an amount of the coolant circulated in each of the engine, the exhaust heat exchanger, the radiator, the water-cooled intercooler, and the sub-radiator when the coolant temperature is less than a predetermined first temperature, preheating coolant and cooling intake air by controlling an amount of the coolant circulated in each of the engine, the exhaust heat exchanger, the radiator, the water-cooled intercooler, and the sub-radiator when the coolant temperature is equal to or greater than the predetermined first temperature and is less than a predetermined second temperature, cooling coolant and intake air by controlling an amount of the coolant circulated in each of the engine, the exhaust heat exchanger, the radiator, the water-cooled intercooler, and the sub-radiator when the coolant temperature is equal to or greater than the predetermined second temperature and is less than a predetermined third temperature, and cooling the engine by controlling an amount of the coolant circulated in each of the engine, the exhaust heat exchanger, the radiator, the water-cooled intercooler, and the sub-radiator when the coolant temperature is equal to or greater than the predetermined third temperature.

The preheating coolant and intake air may include preheating the coolant by opening a passage of the coolant circulated in the exhaust heat exchanger and closing a portion of a passage of the coolant circulated in the engine while closing a passage of the coolant circulated in the radiator, and preheating the intake air by opening a passage of the coolant circulated along the water-cooled intercooler and closing a passage of the coolant circulated along the sub-radiator.

The preheating coolant and cooling intake air may include preheating the coolant by opening a passage of the coolant circulated in the exhaust heat exchanger, fully opening a passage of the coolant circulated in the engine, and closing a passage of the coolant circulated in the radiator, and cooling the intake air by closing a passage of the coolant circulated along the water-cooled intercooler and opening a passage of the coolant circulated along the sub-radiator.

The cooling coolant and intake air may include cooling the coolant by closing a passage of the coolant circulated in the exhaust heat exchanger, fully opening a passage of the coolant circulated in the engine, and closing a passage of the coolant circulated in the radiator, and cooling the intake air by closing a passage of the coolant circulated along the water-cooled intercooler and opening a passage of the coolant circulated along the sub-radiator.

The cooling the engine may include closing a passage of the coolant circulated in the exhaust heat exchanger, fully opening a passage of the coolant circulated in the engine, and opening a passage of the coolant circulated in the radiator, and closing a passage of the coolant circulated along the water-cooled intercooler and opening a passage of the coolant circulated along the sub-radiator.

The preheating the coolant may include closing a portion of the passage of the coolant circulated in the engine by closing a passage of coolant circulated in a cylinder block side of the engine and opening a passage of coolant circulated in a cylinder head side of the engine.

The passage of the coolant circulated in the engine may be fully opened by opening both of a passage of coolant circulated in a cylinder block side of the engine and a passage of coolant circulated in a cylinder head side of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B, FIG. 2C and FIG. 2D are flowcharts illustrating a process of recovering exhaust heat in a vehicle according to the embodiment of the present invention.

Figure 1:
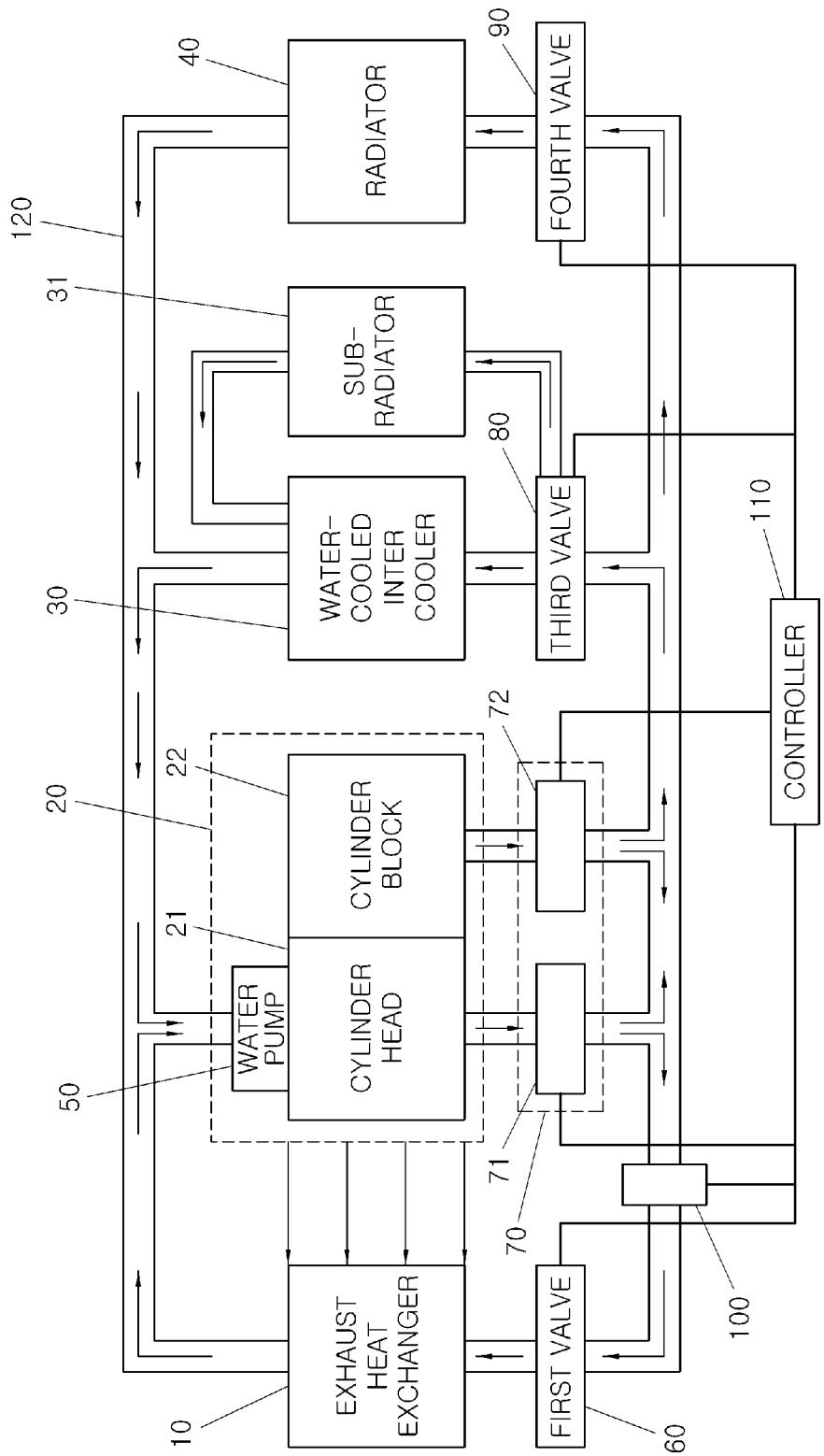
FIG. 1 is a diagram schematically illustrating a vehicle exhaust heat recovery system according to an embodiment of the present invention.
Figure 2B:
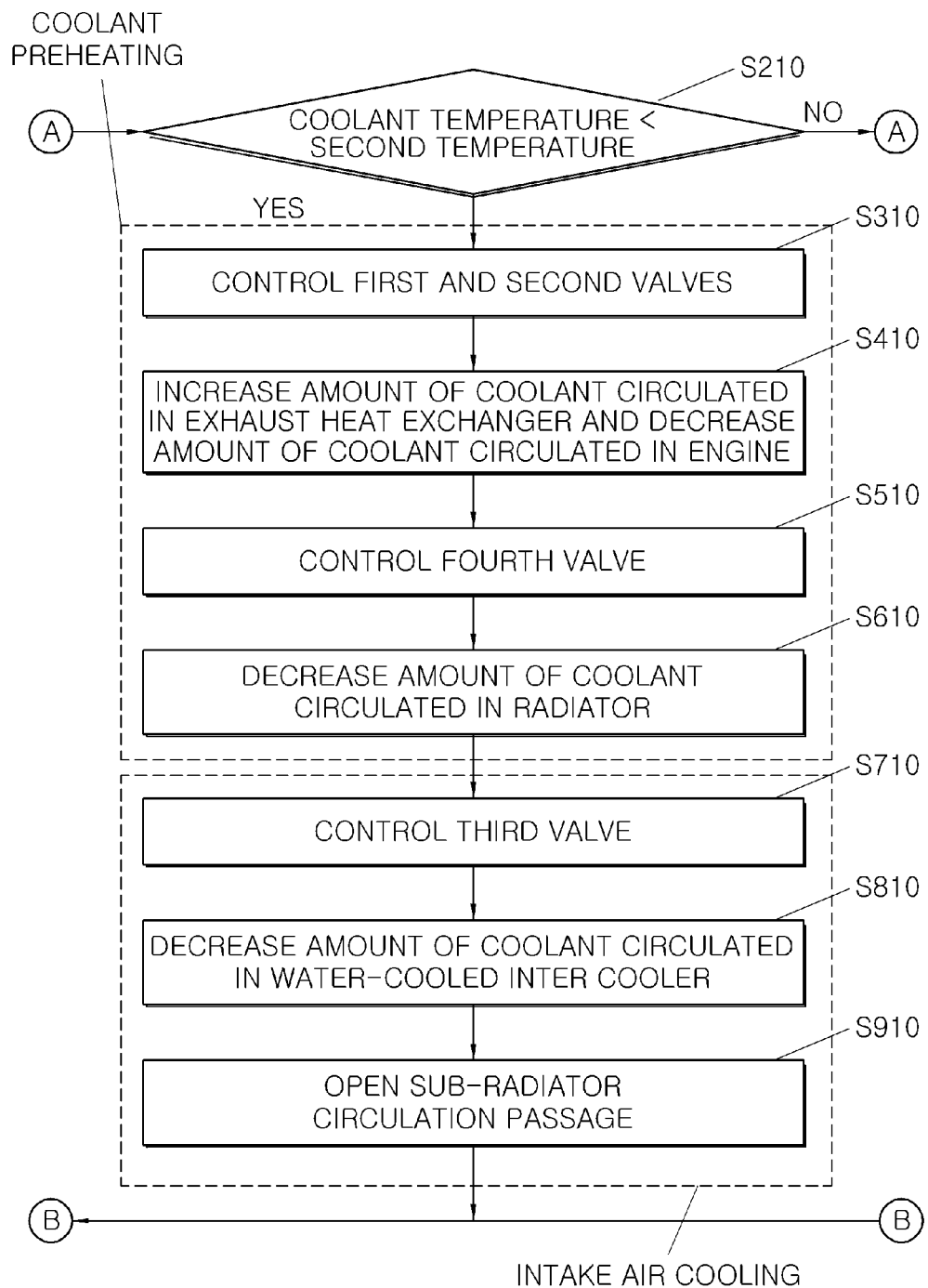
Figure 2C:
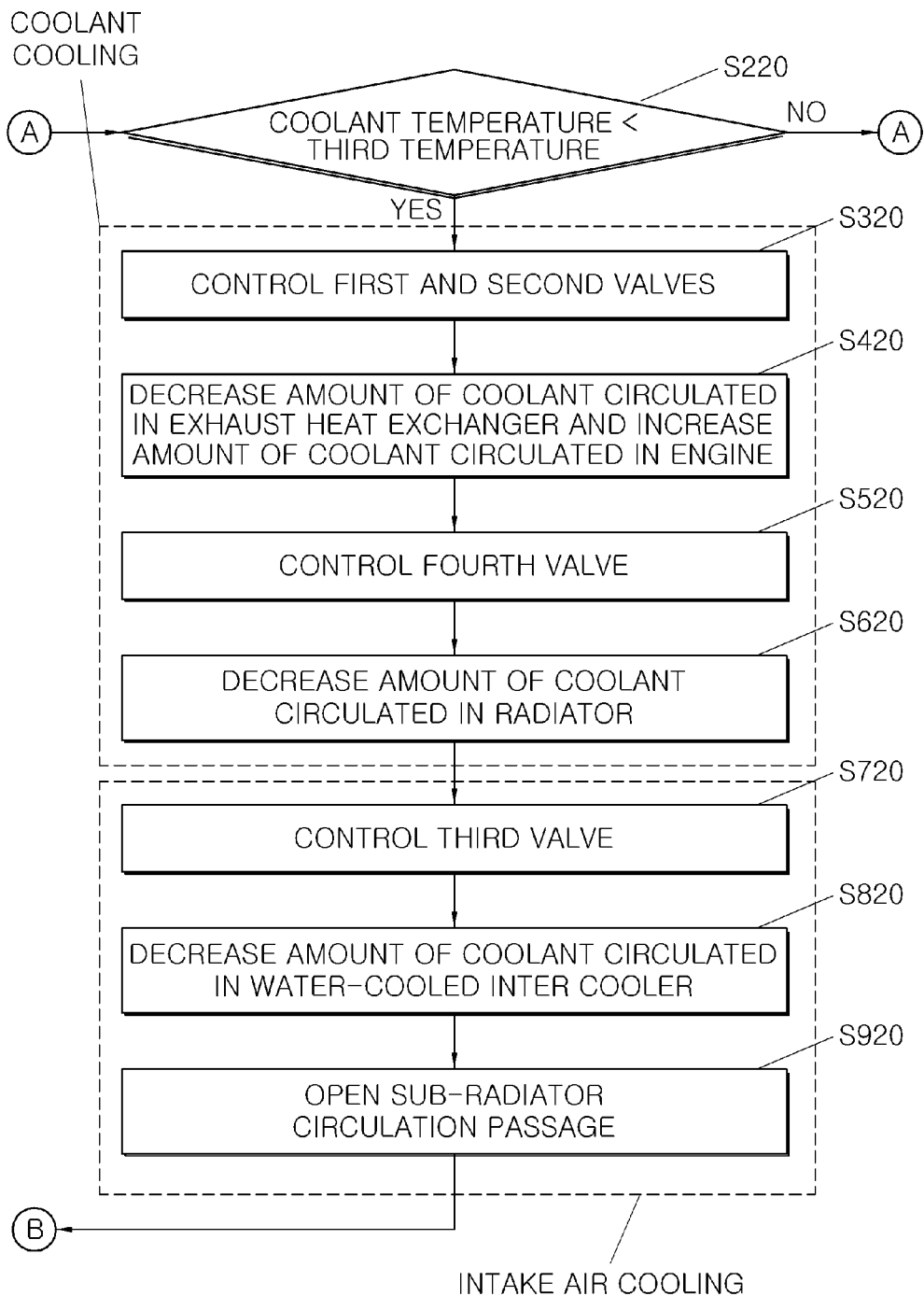
Figure 2D:
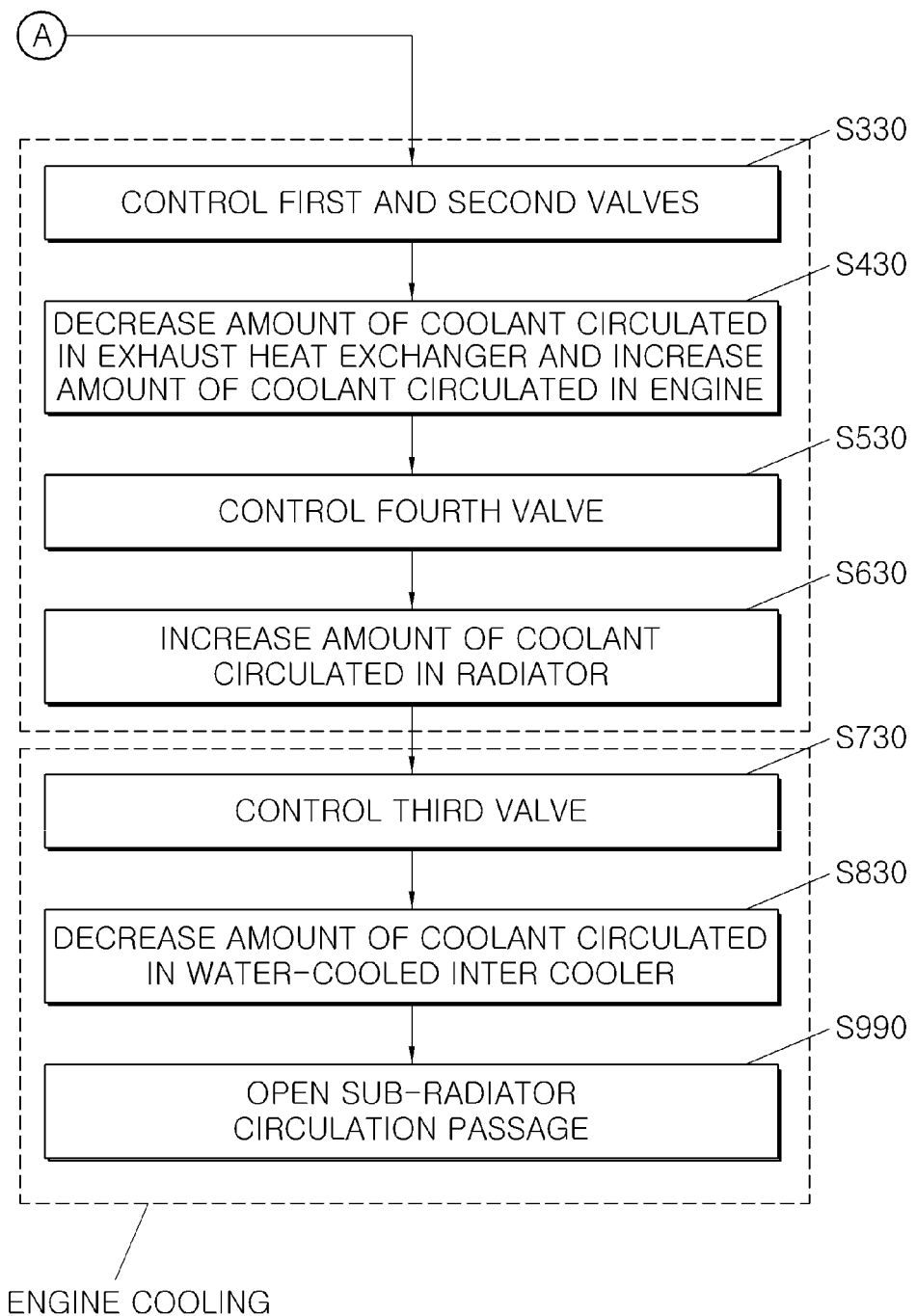

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a diagram schematically illustrating a vehicle exhaust heat recovery system according to an exemplary embodiment of the present invention. Referring to FIG. 1, the vehicle exhaust heat recovery system according to the exemplary embodiment of the present invention includes an exhaust heat exchanger 10, a water-cooled intercooler 30, a sub-radiator 31, a radiator 40, a coolant circulation circuit 120 which connects an engine 20, the exhaust heat exchanger 10, the water-cooled intercooler 30, the sub-radiator 31, and the radiator 40, a water pump 50, first to fourth valves 60, 70, 80, and 90, a temperature sensor 100, and a controller 110.

The exhaust heat exchanger 10 is configured such that coolant is circulated therein. The exhaust heat exchanger 10 transfers heat energy of exhaust gas from the engine 20 to the coolant and increases a temperature of the coolant, so as to shorten a warm-up time of the engine 20 in a cold state. The exhaust heat exchanger 10 communicates with the coolant circulation circuit 120 through the first valve 60 as a control valve.

The radiator 40 is configured such that coolant is circulated therein. The radiator 40 radiates heat of coolant having a temperature increased by combustion heat of the engine 20 after the engine 20 is sufficiently warmed up, so as to cool the coolant. The radiator 40 communicates with the coolant circulation circuit 120 through the fourth valve 90 as a control valve.

The water-cooled intercooler 30 is configured such that coolant is circulated therein. The water-cooled intercooler 30 exchanges heat between high-temperature intake air supercharged into the engine 20 and coolant so as to cool the intake air before the intake air is introduced into the engine 20. The coolant having a temperature increased by heat exchange with the intake air exchanges heat with outdoor air through the sub-radiator 31 connected to the water-cooled intercooler 30, thereby having a decreased temperature. The coolant supplied through the coolant circulation circuit 120 is branched into the water-cooled intercooler 30 and the sub-radiator 31 through the third valve 80 as a three-way valve.

The coolant supplied to the engine 20 cools the engine while passing through circulation passages formed in a cylinder head 21 and a cylinder block 22 of the engine 20. The engine 20 communicates with the coolant circulation circuit 120 through the second valve 70 as a control valve. The circulation passages formed in the cylinder head 21 and the cylinder block 22 are preferably connected to the coolant circulation circuit 120 through a cylinder head-side valve 71 and a cylinder block-side valve 72. In addition, the circulation passage formed in the cylinder head 21 preferably communicates with the circulation passage formed in the cylinder block 22.

The coolant is circulated through the engine 20, the exhaust heat exchanger 10, the water-cooled intercooler 30, the sub-radiator 31, and the radiator 40 along the coolant circulation circuit 120 by the water pump 50. It is preferable that the water pump 50 is mounted to the cylinder head 21 of the engine 20 and is driven by receiving rotational force through a drive belt or the like from a cam shaft or a crank shaft of the engine 20.

The temperature sensor 100 is provided on the coolant circulation circuit 120 and detects a temperature of the coolant circulated along the coolant circulation circuit 120.

The controller 110 receives information on the temperature of the coolant transferred from the temperature sensor 100 and adjusts opening degrees of the first to fourth valves 60, 70, 80, and 90, so as to control an amount or a path of the coolant introduced into the sub-radiator 31 and the radiator 40.

For example, since the engine is in a cold starting state when the coolant temperature detected by the temperature sensor 100 is less than a first temperature (for instance, 30°), it is necessary to rapidly increase the coolant temperature for rapid warm-up of the engine.

Accordingly, the controller 110 opens the first valve 60 to introduce the coolant into the exhaust heat exchanger 10 while closing the fourth valve 90 to block introduction of the coolant into the radiator 40. In addition, since there is no need to cool the cylinder block 22 using the coolant in the cold state, the controller 110 closes the cylinder block-side valve 72 and opens the cylinder head-side valve 71, thereby enabling the coolant to be circulated in the coolant circulation circuit 120 by passing through only the cylinder head 21. Through such a configuration, it may be possible to rapidly preheat the coolant by decreasing an amount of the coolant passing through the engine 20 and increasing an amount of the coolant passing through the exhaust heat exchanger 10.

In addition, the controller 110 controls the third valve 80 to supply the coolant preheated by the exhaust heat exchanger 10 to the water-cooled intercooler 30 and close the passage branched into the sub-radiator 31. Consequently, the controller 110 may preheat the intake air introduced into the engine 20 using the preheated coolant.

As such, the controller 110 may preheat the coolant and the intake air and rapidly warm up the engine by controlling the first to fourth valves 60, 70, 80, and 90 when the coolant temperature is less than the first temperature.

Figure 3:
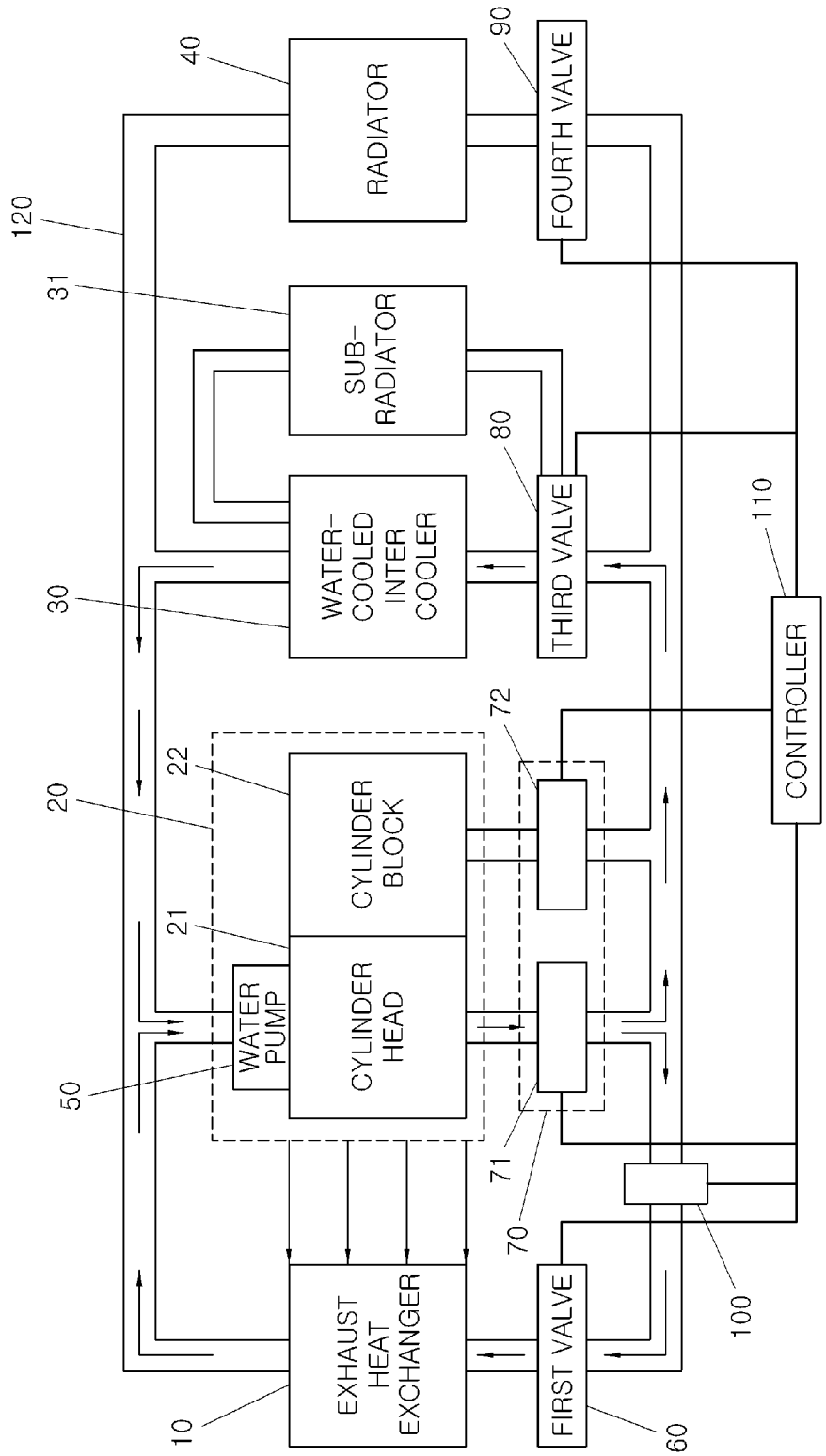
FIG. 3 is a diagram schematically illustrating a coolant circulation flow in the vehicle exhaust heat recovery system according to the embodiment of the present invention.

FIG. 3 shows a flow of the coolant circulated along the coolant circulation circuit according to the exemplary embodiment of the present invention when the coolant temperature is less than the first temperature. Referring to FIG. 3, the coolant pumped by the water pump 50 is circulated between the cylinder head 21 of the engine 20, the exhaust heat exchanger 10, and the water-cooled intercooler 30.

Meanwhile, since the engine is in a state in which the warm-up thereof is completed to a certain extent when the coolant temperature detected by the temperature sensor 100 is equal to or greater than the first temperature, it is necessary to increase a supply amount of the coolant to the engine 20 and to cool the intake air to the engine in order to increase power of the engine.

Accordingly, similarly to the case in which the coolant temperature detected by the temperature sensor 100 is less than the first temperature, the controller 110 opens the first valve 60 to introduce the coolant into the exhaust heat exchanger 10 while closing the fourth valve 90 to block introduction of the coolant into the radiator 40. The controller 110 opens both of the cylinder block-side valve 72 and the cylinder head-side valve 71 in order to increase the supply amount of the coolant to the engine 20, thereby enabling a great amount of coolant to be circulated throughout the cylinder head 21 and the cylinder block 22. Through such a configuration, it may be possible to increase the amount of the coolant and preheat the coolant.

In addition, the controller 110 controls the third valve 80 to close the passage in which the preheated coolant is directly supplied to the water-cooled intercooler 30 through the exhaust heat exchanger 10 and to open the passage branched into the sub-radiator 31. Consequently, the controller 110 may cool the intake air introduced into the engine 20 using the coolant cooled by the sub-radiator 31. Thus, it may be possible to generally increase the amount of the coolant supplied to the engine 20 and prevent the power of the engine from being deteriorated due to increase in temperature of the intake air.

Figure 4:
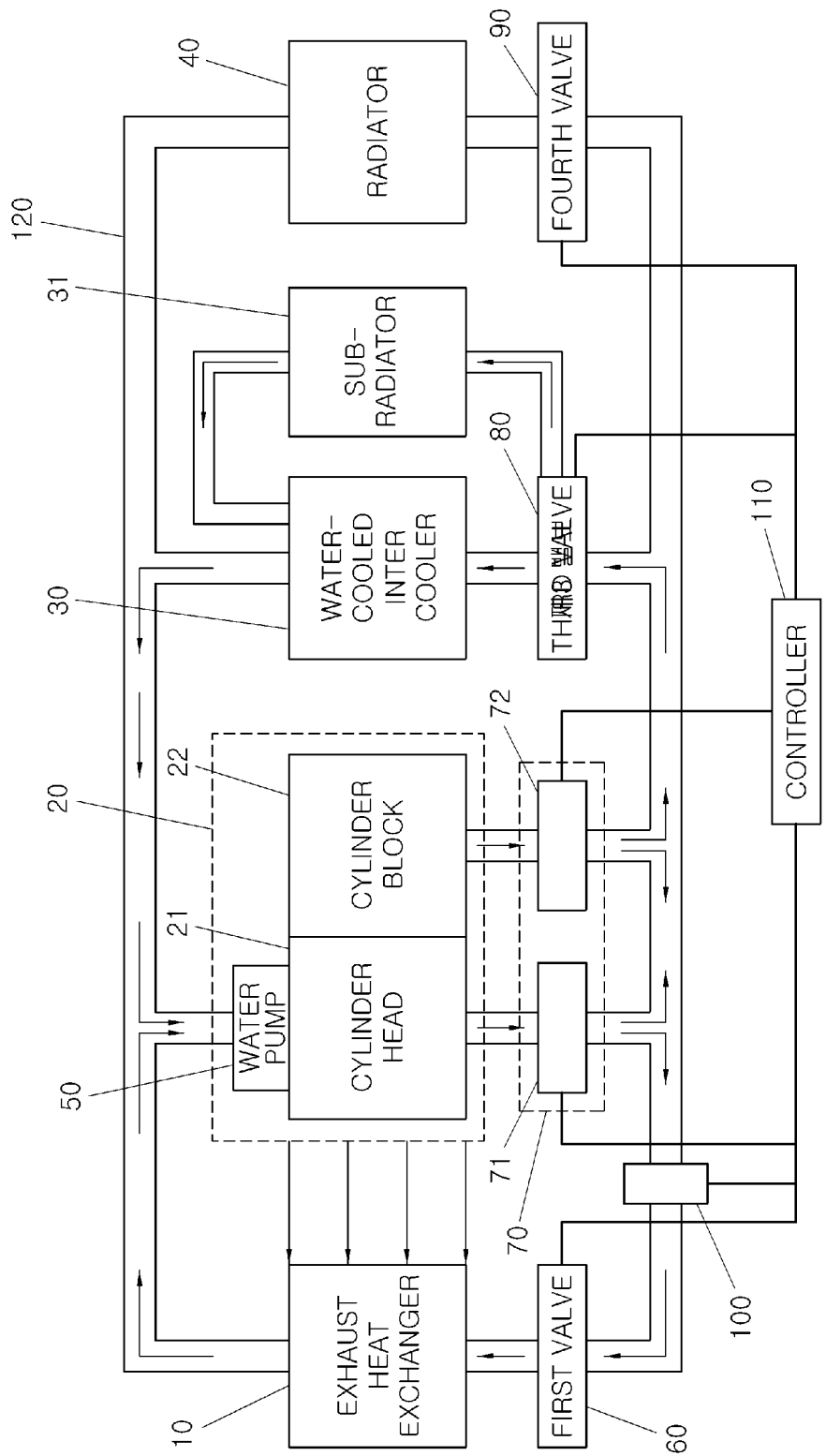
FIG. 4 is a diagram schematically illustrating a coolant circulation flow in a vehicle exhaust heat recovery system according to another embodiment of the present invention.

FIG. 4 shows a flow of the coolant circulated along the coolant circulation circuit according to the exemplary embodiment of the present invention when the coolant temperature is equal to or greater than the first temperature and is less than a second temperature. Referring to FIG. 4, the coolant pumped by the water pump 50 is circulated through the cylinder head 21 and cylinder block 22 of the engine 20, and the exhaust heat exchanger 10, and the coolant cooled by passing through the sub-radiator 31 is introduced into the water-cooled intercooler 30.

Meanwhile, since the engine is in a state in which the warm-up thereof is completed when the coolant temperature detected by the temperature sensor 100 is equal to or greater than the second temperature and is less than a third temperature, it is necessary to cool both of the coolant and the intake air such that the temperature of the engine is not increased due to the exhaust heat recovery and the high-temperature intake air.

Accordingly, the controller 110 closes the first valve 60 to block introduction of the coolant into the exhaust heat exchanger 10, thereby preventing overheating of the coolant due to the exhaust heat of the engine 20. In addition, since the engine is not in an overheated state, the controller 110 suppresses the coolant from being introduced to the radiator 40 by closing the fourth valve 90. The controller 110 opens both of the cylinder block-side valve 72 and the cylinder head-side valve 71 in order to increase the supply amount of the coolant to the engine 20, thereby enabling a great amount of coolant to be circulated throughout the cylinder head 21 and the cylinder block 22. Through such a configuration, it may be possible to increase the amount of the coolant passing through the engine 20 and sufficiently cool the coolant.

In addition, the controller 110 controls the third valve 80 to close the passage in which the preheated coolant is directly supplied to the water-cooled intercooler 30 through the exhaust heat exchanger 10 and to open the passage branched into the sub-radiator 31. Consequently, the controller 110 may cool the intake air introduced into the engine 20 using the coolant cooled by the sub-radiator 31. Thus, it may be possible to generally increase the amount of the coolant supplied to the engine 20 and prevent the temperature of the engine from increasing due to the exhaust heat recovery and increase in temperature of the intake air and the power of the engine from being deteriorated due to increase in temperature of the intake air.

Figure 5:
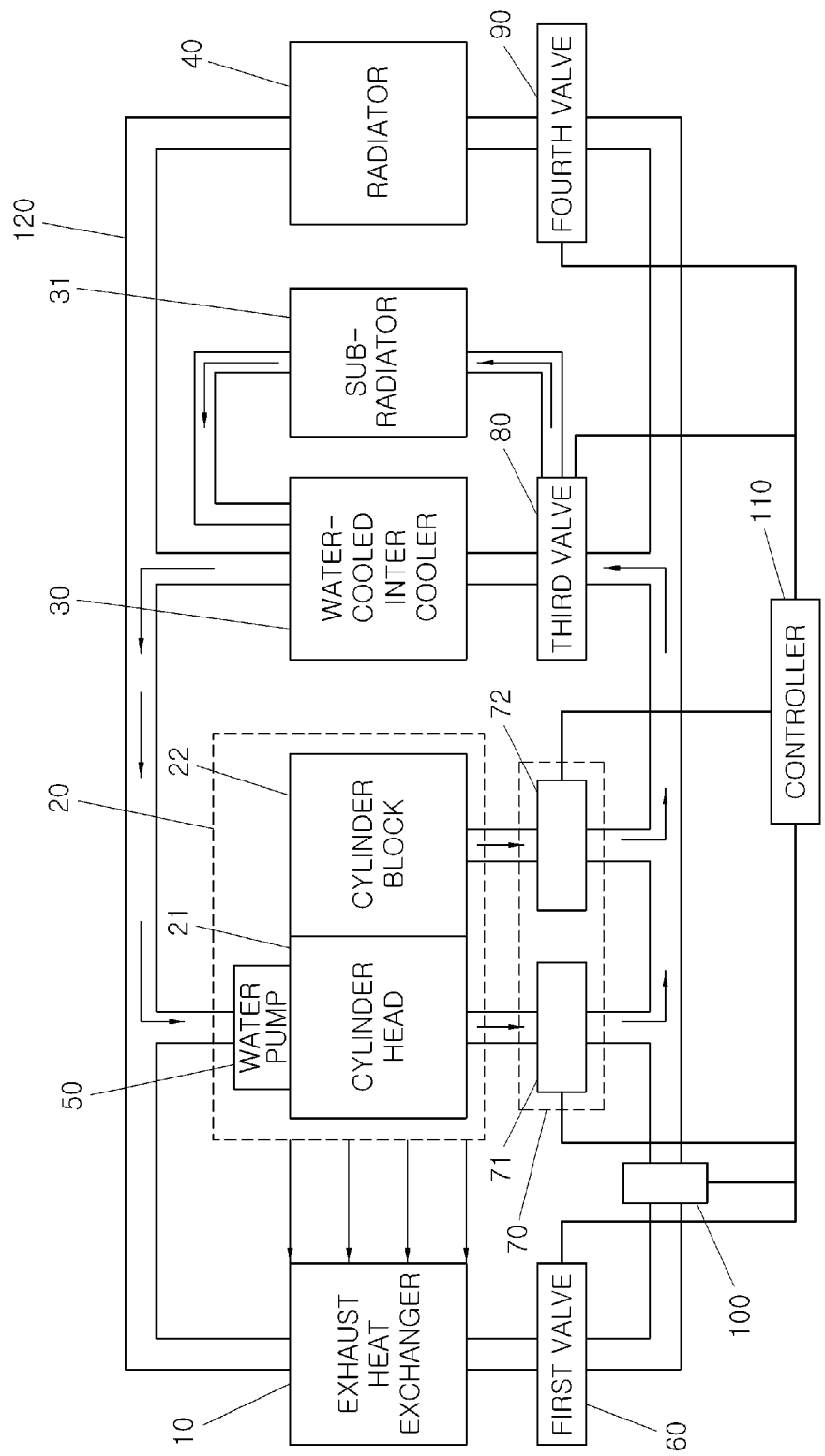
FIG. 5 is a diagram schematically illustrating a coolant circulation flow in a vehicle exhaust heat recovery system according to still another embodiment of the present invention.

FIG. 5 shows a flow of the coolant circulated along the coolant circulation circuit according to the exemplary embodiment of the present invention when the coolant temperature is equal to or greater than the second temperature and is less than the third temperature. Referring to FIG. 5, the coolant pumped by the water pump 50 is circulated through the cylinder head 21 and cylinder block 22 of the engine 20, and the coolant cooled by passing through the sub-radiator 31 is introduced into the water-cooled intercooler 30.

Meanwhile, since the coolant is in an overheated state when the coolant temperature detected by the temperature sensor 100 is equal to or greater than the third temperature, it is necessary to rapidly supply a great amount of coolant to the engine and rapidly decrease the coolant temperature.

Accordingly, the controller 110 closes the first valve 60 to block introduction of the coolant into the exhaust heat exchanger 10, thereby preventing overheating of the coolant due to the exhaust heat of the engine 20. In addition, the controller 110 opens the fourth valve 90 to introduce the coolant into the radiator 40, thereby decreasing the coolant temperature by radiating heat of the coolant. The controller 110 opens both of the cylinder block-side valve 72 and the cylinder head-side valve 71 in order to increase the supply amount of the coolant to the engine 20, thereby enabling a great amount of coolant to be circulated throughout the cylinder head 21 and the cylinder block 22. Through such a configuration, it may be possible to increase the amount of the coolant passing through the engine 20 and cool the coolant.

In addition, the controller 110 controls the third valve 80 to close the passage in which the preheated coolant is directly supplied to the water-cooled intercooler 30 through the exhaust heat exchanger 10 and to open the passage branched into the sub-radiator 31. Consequently, the controller 110 may cool the intake air introduced into the engine 20 using the coolant cooled by the sub-radiator 31.

Through such control, it may be possible to rapidly decrease the coolant temperature, increase the amount of the coolant supplied to the engine 20, and prevent the engine from being overheated and the power of the engine from being deteriorated due to increase in temperature of the intake air by cooling the intake air supercharged into the engine.

Figure 6:
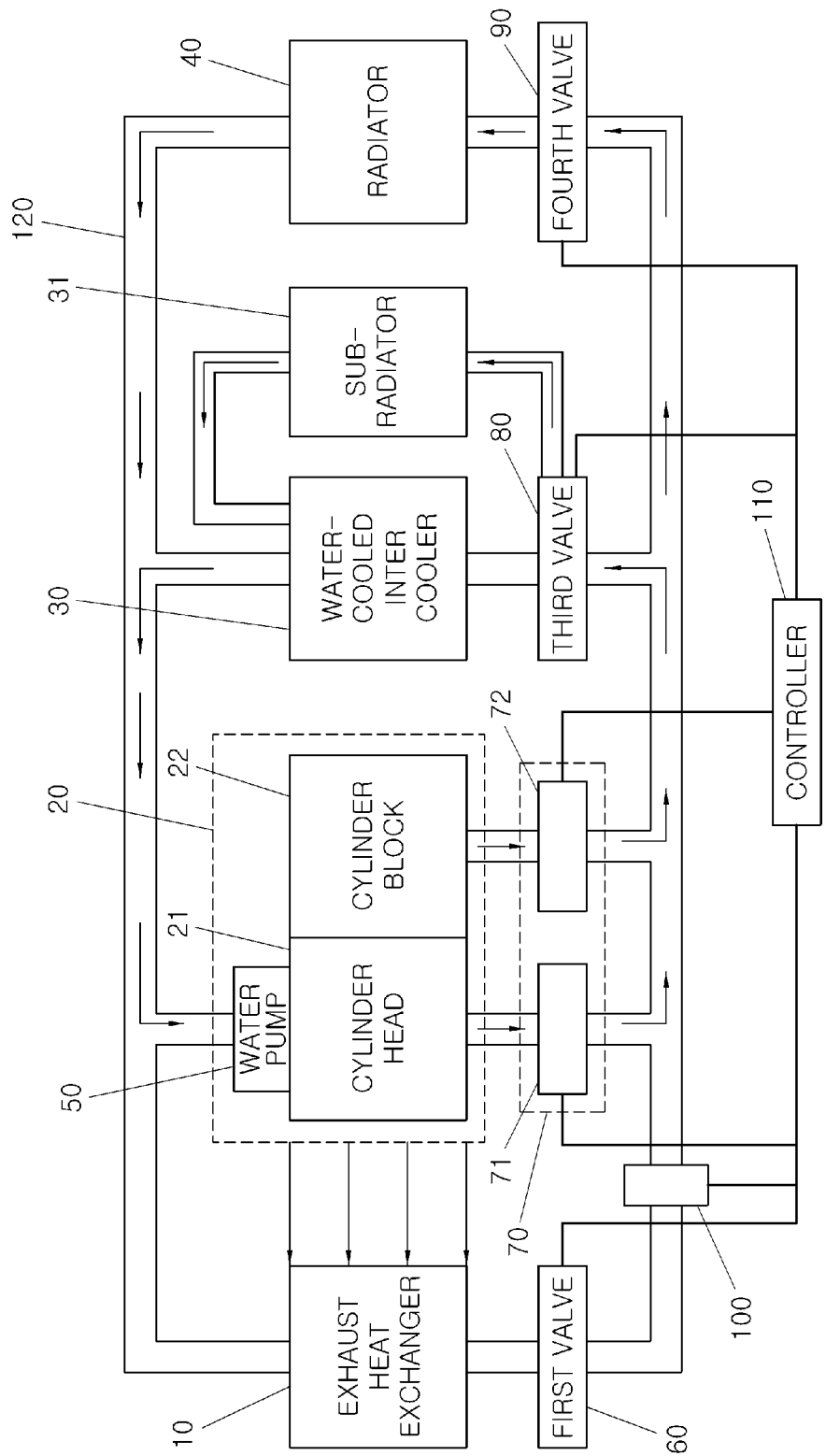
FIG. 6 is a diagram schematically illustrating a coolant circulation flow in a vehicle exhaust heat recovery system according to a further embodiment of the present invention.

FIG. 6 shows a flow of the coolant circulated along the coolant circulation circuit according to the exemplary embodiment of the present invention when the coolant temperature is equal to or greater than third temperature. Referring to FIG. 6, the coolant pumped by the water pump 50 is circulated through the cylinder head 21 and cylinder block 22 of the engine 20 and the radiator 40, and the exhaust heat exchanger 10, and the coolant cooled by passing through the sub-radiator 31 is introduced into the water-cooled intercooler 30.

Hereinafter, an exhaust heat recovery method according to an exemplary embodiment of the present invention using the above exhaust heat recovery system will be described with reference to FIG. 2A, FIG. 2B, FIG. 2C and FIG. 2D.

First, the temperature of the coolant circulated along the coolant circulation circuit 120 is detected by the temperature sensor 100 (S100).

Next, it is determined whether or not the coolant temperature is less than a predetermined first temperature (S110). When the coolant temperature is less than the first temperature, it is determined that the starting of the engine is turned on in the cold state. In this case, it is determined that the warm-up of the engine is required, and thus a coolant and intake air preheating step is performed.

Specifically, the opening degree of the first valve 60 for opening and closing the passage between the exhaust heat exchanger 10 and the coolant circulation circuit 120 and the opening degree of the second valve 70 for opening and closing the passage between the engine 20 and the coolant circulation circuit 120 are adjusted (S300). For example, as described above, the cylinder block-side valve 72 is closed and the cylinder head-side valve 71 is opened such that the coolant passes through only of the cylinder head 21 and is circulated in the coolant circulation circuit 120. Consequently, the amount of the coolant circulated in the engine 20 is decreased and the amount of the coolant circulated in the exhaust heat exchanged 10 is increased (S400) by opening of the first valve 60.

In addition, the fourth valve 90 is controlled (S500) such that the amount of the coolant introduced into the radiator 40 is decreased (S600) or the introduction of the coolant into the radiator 40 is blocked, thereby enabling the coolant temperature to be prevented from being decreased. Through the above steps S300 to S600, the coolant may be preheated.

In addition, the third valve 80 is controlled (S700) such that the amount of the coolant introduced into the water-cooled intercooler 30 is increased (S800) and the passage branched into the sub-radiator 31 is closed (S900), thereby enabling the intake air to be preheated as described above.

When the coolant temperature is detected to be equal to or greater than the first temperature, it is determined whether or not the coolant temperature is less than a predetermined second temperature (S210). In this case, it is determined that the engine is warmed up to a certain extent when the coolant temperature is less than the second temperature, and thus a coolant preheating and intake air cooling step is performed.

Specifically, the opening degree of the first valve 60 for opening and closing the passage between the exhaust heat exchanger 10 and the coolant circulation circuit 120 and the opening degree of the second valve 70 for opening and closing the passage between the engine 20 and the coolant circulation circuit 120 are adjusted (S310). For example, as described above, both of the cylinder block-side valve 72 and the cylinder head-side valve 71 are opened such that the coolant is circulated in both of the cylinder head 21 and the cylinder block 22. Consequently, the amount of the coolant circulated in the engine 20 is increased and the amount of the coolant circulated in the exhaust heat exchanged 10 is increased (S410) by opening of the first valve 60.

In addition, the fourth valve 90 is controlled (S510) such that the amount of the coolant introduced into the radiator 40 is decreased (S610) or the introduction of the coolant into the radiator 40 is blocked, thereby enabling the coolant temperature to be prevented from being excessively decreased.

Through the above steps S310 to S610, the coolant may be preheated.

In addition, the third valve 80 is controlled (S710) such that the amount of the coolant introduced into the water-cooled intercooler 30 is decreased (S810), or the introduction of the coolant into the water-cooled intercooler 30 is blocked and the passage branched into the sub-radiator 31 is opened (S910), thereby enabling the intake air to be cooled as described above.

When the coolant temperature is detected to be equal to or greater than the second temperature, it is determined whether or not the coolant temperature is less than a predetermined third temperature (S220). In this case, it is determined that the warm-up of the engine is completed when the coolant temperature is less than the third temperature, and thus a coolant and intake air cooling step is performed.

Specifically, the opening degree of the first valve 60 for opening and closing the passage between the exhaust heat exchanger 10 and the coolant circulation circuit 120 and the opening degree of the second valve 70 for opening and closing the passage between the engine 20 and the coolant circulation circuit 120 are adjusted (S320). For example, as described above, both of the cylinder block-side valve 72 and the cylinder head-side valve 71 are opened such that the coolant is circulated in both of the cylinder head 21 and the cylinder block 22. Consequently, the amount of the coolant circulated in the engine 20 is increased and the amount of the coolant circulated in the exhaust heat exchanged 10 is decreased (S420) or the introduction of the coolant into the exhaust heat exchanged 10 is blocked by adjustment of the first valve 60.

In addition, the fourth valve 90 is controlled (S520) such that the circulation passage to the radiator 40 is closed or the amount of the coolant introduced into the radiator 40 is decreased (S620), thereby enabling the coolant temperature to be prevented from being excessively decreased.

Through the above steps S320 to S620, the coolant may be cooled.

In addition, the third valve 80 is controlled (S720) such that the amount of the coolant introduced into the water-cooled intercooler 30 is decreased (S820), or the introduction of the coolant into the water-cooled intercooler 30 is blocked and the passage branched into the sub-radiator 31 is opened (S910), thereby enabling the intake air to be cooled as described above.

When the coolant temperature is equal to or greater than the third temperature, it is determined that the engine is overheated. In this case, an engine cooling step is performed to rapidly decrease the engine temperature and the coolant temperature.

Specifically, the opening degree of the first valve 60 for opening and closing the passage between the exhaust heat exchanger 10 and the coolant circulation circuit 120 and the opening degree of the second valve 70 for opening and closing the passage between the engine 20 and the coolant circulation circuit 120 are adjusted (S330). For example, as described above, both of the cylinder block-side valve 72 and the cylinder head-side valve 71 are opened such that the coolant is circulated in both of the cylinder head 21 and the cylinder block 22. Consequently, the amount of the coolant circulated in the engine 20 is increased, and the amount of the coolant circulated in the exhaust heat exchanged 10 is decreased (S430) or the introduction of the coolant into the exhaust heat exchanged 10 is blocked by adjustment of the first valve 60.

In addition, the fourth valve 90 is controlled (S530) such that the circulation passage to the radiator 40 is opened and the amount of the coolant introduced into the radiator 40 is increased (S630), thereby enabling the coolant temperature to be decreased by rapid radiation of heat of the coolant. Through the above steps S330 to S630, the coolant may be rapidly cooled.

In addition, the third valve 80 is controlled (S730) such that the amount of the coolant introduced into the water-cooled intercooler 30 is decreased (S830), or the introduction of the coolant into the water-cooled intercooler 30 is blocked and the passage branched into the sub-radiator 31 is opened (S930), thereby enabling the intake air to be cooled as described above.

In accordance with the exemplary embodiments of the present invention, it may be possible to significantly shorten a warm-up time of an engine and an activation time of a catalyst and to achieve reduction of fuel efficiency and stable emission of exhaust gas, by controlling a passage of coolant circulated through an exhaust heat exchanger, an engine, a radiator, and a water-cooled intercooler without a configuration of a complicated passage for bypassing exhaust gas or coolant.

While the present invention has been described with respect to the specific embodiments, it will be apparent to those skilled in the art that various changes and modifications may be made without departing from the spirit and scope of the invention as defined in the following claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust heat recovery system comprising:
   an exhaust heat exchanger transferring heat energy of exhaust gas discharged from an engine to coolant to increases a temperature of the coolant;
   a radiator radiating heat of the coolant heated through heat exchange with the engine;
   a water-cooled intercooler cooling intake air using the coolant;
   a sub-radiator radiating heat of the coolant heated through the water-cooled intercooler;
   a coolant circulation circuit arranged to connect the engine, the exhaust heat exchanger, the radiator, the water-cooled intercooler, and the sub-radiator;
   a water pump allowing the coolant to be circulated along the coolant circulation circuit through the engine, the exhaust heat exchanger, the radiator, the water-cooled intercooler, and the sub-radiator;
   a first valve for opening and closing connection between the exhaust heat exchanger and the coolant circulation circuit;
   a second valve for opening and closing connection between the engine and the coolant circulation circuit;
   a third valve mounted on a distribution line for distributing the coolant supplied along the coolant circulation circuit to the water-cooled water pump and the sub-radiator;
   a fourth valve for opening and closing connection between the radiator and the coolant circulation circuit;
   a temperature sensor for measuring the temperature of the coolant circulated along the coolant circulation circuit; and
   a controller adjusting opening degrees of the first to fourth valves according to the temperature of the coolant measured by the temperature sensor,
   wherein the controller preheats the coolant and the intake air when the temperature of the coolant detected by the temperature sensor is less than a first temperature, preheats the coolant and cools the intake air when the temperature of the coolant detected by the temperature sensor is equal to or greater than the first temperature and is less than a second temperature, cools the coolant and the intake air when the temperature of the coolant detected by the temperature sensor is equal to or greater than the second temperature and is less than a third temperature, and cool the engine when the coolant temperature detected by the temperature sensor is equal to or greater than the third temperature, by adjusting the opening degrees of the first to fourth valves.

2. The exhaust heat recovery system of claim 1, wherein the engine has a passage communicating between a cylinder head and a cylinder block such that the coolant flows in the passage; and
   the second valve comprises a cylinder head-side valve for blocking circulation of the coolant from the cylinder head of the engine to the coolant circulation circuit, and a cylinder block-side valve for blocking circulation of the coolant from the cylinder block of the engine to the coolant circulation circuit.

3. The exhaust heat recovery system of claim 2, wherein the water pump is mounted to the cylinder head of the engine to be driven by receiving rotational force through a drive belt from a cam shaft or a crank shaft.

4. The exhaust heat recovery system of claim 1, wherein when the temperature of the coolant detected by the temperature sensor is less than the first temperature, the controller opens the first valve to open a coolant passage of the exhaust heat exchanger, opens the cylinder head-side valve and closes the cylinder block-side valve of the second valve to decrease a flow rate of the coolant passing through the engine by opening of only a cylinder head-side coolant passage of the engine, controls the third valve to open a passage of the coolant flowing to the water-cooled intercooler while closing a passage of the coolant flowing to the sub-radiator, and controls the fourth valve to close a passage of the coolant flowing to the radiator.

5. The exhaust heat recovery system of claim 1, wherein when the temperature of the coolant detected by the temperature sensor is equal to or greater than the first temperature, the controller opens the first valve to open a coolant passage of the exhaust heat exchanger, opens the cylinder head-side valve and the cylinder block-side valve to open both of a cylinder head-side coolant passage and a cylinder block-side coolant passage of the engine, controls the third valve to close a passage of the coolant flowing to the water-cooled intercooler while opening a passage of the coolant flowing to the sub-radiator, and closes the fourth valves to close a passage of the coolant flowing to the radiator.

6. The exhaust heat recovery system of claim 1, wherein when the temperature of the coolant detected by the temperature sensor is equal to or greater than the second temperature and is less than the third temperature, the controller closes the first valve to close a coolant passage of the exhaust heat exchanger, opens the cylinder head-side valve and the cylinder block-side valve to open both of a cylinder head-side coolant passage and a cylinder block-side coolant passage of the engine, controls the third valve to close a passage of the coolant flowing to the water-cooled intercooler while opening a passage of the coolant flowing to the sub-radiator, and closes the fourth valves to close a passage of the coolant flowing to the radiator.

7. The exhaust heat recovery system of claim 1, wherein when the temperature of the coolant detected by the temperature sensor is equal to or greater than the third temperature, the controller closes the first valve to close a coolant passage of the exhaust heat exchanger, opens the cylinder head-side valve and the cylinder block-side valve to open both of a cylinder head-side coolant passage and a cylinder block-side coolant passage of the engine, controls the third valve to close a passage of the coolant flowing to the water-cooled intercooler while opening a passage of the coolant flowing to the sub-radiator, and opens the fourth valves to open a passage of the coolant flowing to the radiator.

8. A vehicle exhaust heat recovery method using a vehicle exhaust heat recovery system having a circulation circuit of coolant circulated along an engine, an exhaust heat exchanger, a radiator, a water-cooled intercooler, and a sub-radiator for cooling an engine, comprising:
  detecting a temperature of the coolant;
  preheating coolant and intake air by controlling an amount of the coolant circulated in each of the engine, the exhaust heat exchanger, the radiator, the water-cooled intercooler, and the sub-radiator when the temperature of the coolant is less than a predetermined first temperature;
  preheating coolant and cooling intake air by controlling an amount of the coolant circulated in each of the engine, the exhaust heat exchanger, the radiator, the water-cooled intercooler, and the sub-radiator when the temperature of the coolant is equal to or greater than the predetermined first temperature and is less than a predetermined second temperature;
  cooling coolant and intake air by controlling an amount of the coolant circulated in each of the engine, the exhaust heat exchanger, the radiator, the water-cooled intercooler, and the sub-radiator when the temperature of the coolant is equal to or greater than the predetermined second temperature and is less than a predetermined third temperature; and
  cooling the engine by controlling an amount of the coolant circulated in each of the engine, the exhaust heat exchanger, the radiator, the water-cooled intercooler, and the sub-radiator when the temperature of the coolant is equal to or greater than the predetermined third temperature.

9. The vehicle exhaust heat recovery method of claim 8, wherein the preheating coolant and intake air comprises:
  preheating the coolant by opening a passage of the coolant circulated in the exhaust heat exchanger and closing a portion of a passage of the coolant circulated in the engine while closing a passage of the coolant circulated in the radiator; and
  preheating the intake air by opening a passage of the coolant circulated along the water-cooled intercooler and closing a passage of the coolant circulated along the sub-radiator.

10. The vehicle exhaust heat recovery method of claim 9, wherein the preheating the coolant comprises closing a portion of the passage of the coolant circulated in the engine by closing a passage of coolant circulated in a cylinder block side of the engine and opening a passage of coolant circulated in a cylinder head side of the engine.

11. The vehicle exhaust heat recovery method of claim 8, wherein the preheating coolant and cooling intake air comprises:
  preheating the coolant by opening a passage of the coolant circulated in the exhaust heat exchanger, fully opening a passage of the coolant circulated in the engine, and closing a passage of the coolant circulated in the radiator; and
  cooling the intake air by closing a passage of the coolant circulated along the water-cooled intercooler and opening a passage of the coolant circulated along the sub-radiator.

12. The vehicle exhaust heat recovery method of claim 11, wherein the passage of the coolant circulated in the engine is fully opened by opening both of a passage of coolant circulated in a cylinder block side of the engine and a passage of coolant circulated in a cylinder head side of the engine.

13. The vehicle exhaust heat recovery method of claim 8, wherein the cooling coolant and intake air comprises:
  cooling the coolant by closing a passage of the coolant circulated in the exhaust heat exchanger, fully opening a passage of the coolant circulated in the engine, and closing a passage of the coolant circulated in the radiator; and
  cooling the intake air by closing a passage of the coolant circulated along the water-cooled intercooler and opening a passage of the coolant circulated along the sub-radiator.

14. The vehicle exhaust heat recovery method of claim 13, wherein the passage of the coolant circulated in the engine is fully opened by opening both of a passage of coolant circulated in a cylinder block side of the engine and a passage of coolant circulated in a cylinder head side of the engine.

15. The vehicle exhaust heat recovery method of claim 8, wherein the cooling the engine comprises:
  closing a passage of the coolant circulated in the exhaust heat exchanger, fully opening a passage of the coolant circulated in the engine, and opening a passage of the coolant circulated in the radiator; and
  closing a passage of the coolant circulated along the water-cooled intercooler and opening a passage of the coolant circulated along the sub-radiator.

16. The vehicle exhaust heat recovery method of claim 15, wherein the passage of the coolant circulated in the engine is fully opened by opening both of a passage of coolant circulated in a cylinder block side of the engine and a passage of coolant circulated in a cylinder head side of the engine.

* * * * *